April 21, 1953
L. C. BETTEGA
2,635,350
LEVELING AND PLUMBING DEVICE AND ELEMENTS THEREOF
Filed Oct. 30, 1948
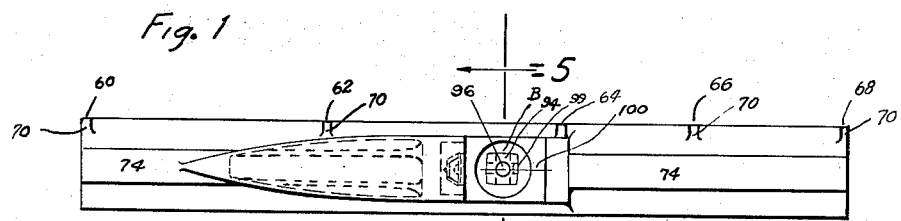
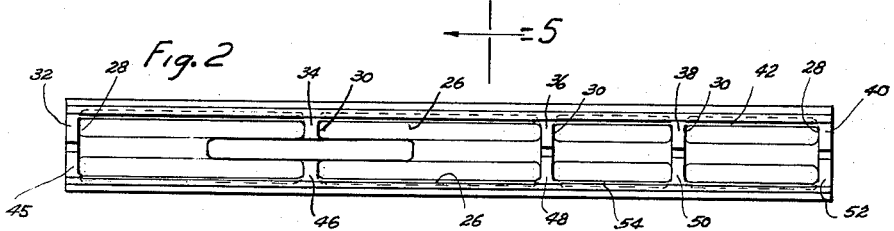
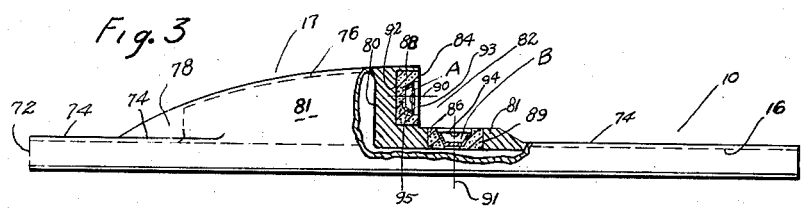
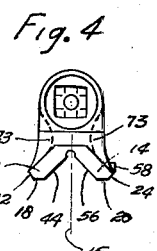
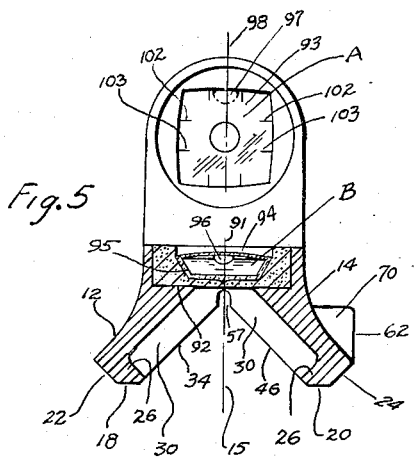
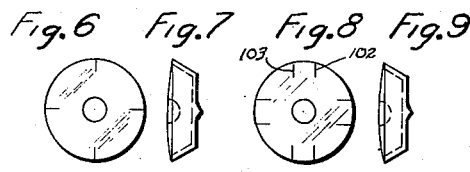
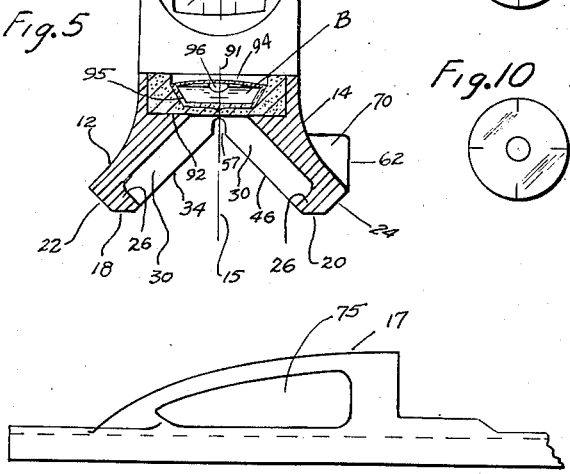
INVENTOR
Louis C. Bettega
BY
Sidney A. Ochs
ATTORNEY Patented Apr. 21, 1953

2,635,350

UNITED STATES PATENT OFFICE 2,635,350

LEVELING AND PLUMBING DEVICE AND ELEMENTS THEREOF

Louis C. Bettega, Berkley, Mich.

Application October 30, 1948, Serial No. 57,517

15 Claims. (Cl. 33—207)

This invention relates to leveling devices or instruments and elements thereof and particularly to devices of this kind wherein one or more box spirit levels are employed to visually ascertain or check the degree of levelness or plumbness of surfaces or objects. The invention moreover concerns itself with improvements in box-type spirit levels having particular use with such devices.

Various leveling devices have heretofore been proposed for checking surface level or plumbness independent spirit levels being used for the respective readings taken. Other leveling devices have embodied structure arranged to check a pair of corner surfaces by a single placement of the leveling device. In no instance to my knowledge have these devices been of a character as to assure the user of the correctness of his reading. Although not suggested, it was possible by reference to secondary spirit levels to acquire some confirmation. However, these secondary indicators were either remotely located or positioned as to require independent observation. Consequently, the chance of confusion especially among the inexperienced as to which indicator would provide the principal reading, was great.

The present invention aims to overcome this problem and it is an object thereof to provide a leveling device with an arrangement and structure aimed to instill in the user confidence in the reading he has taken therewith.

Another object is to provide a light weight, strong, leveling device arranged and constructed for most effective use and easy handling.

A further object is to provide a leveling device whereby the reading of the principal level indicator may be checked by means of a second indicator in a single visual observation of both indicators.

Another object is to provide a leveling device whereby an accurate, precision reading of levelness or plumbness is facilitated.

Still a further object is to provide a leveling device providing means for estimating the amount of correction necessary to render a surface level or plumb.

A particular object is to provide a leveling device with level indicating means which may be effectively used in both vertical and horizontal planes, overhead or below eye level.

Another object is to provide a leveling device with a base structure capable of being held stable when checking the plumbness of inside corners.

A further object is to provide a level indicator of the air bubble box type having its side walls shaped to give added sensitivity to the air bubble when in contact therewith.

Still another object is to provide a leveling device easy to hold and apply to a surface and having its indicating elements so located in relationship to its level checking edges as to facilitate easy and accurate reading of the device without physical discomfort.

These and other objects of my invention will in part be understood and in part be more particularly pointed out in the following description and in the claims taken in conjunction with the accompanying drawing, wherein:

Figure 1 is a top plan view of the leveling device of my invention;

Figure 2 is a bottom plan view of the said device;

Figure 3 is a side elevational view of the said device;

Figure 4 is an end elevational view of the device of my invention looking at the right end of Figure 3;

Figure 5 is a cross-sectional view taken at 5—5 of Figure 1;

Figures 6 to 13 inclusive, are plan and side elevational views respectively, of four modified forms of the box spirit levels shown in Figure 3 and Figure 5; and Figure 14 is a side elevational view of a portion of the device of Figure 3 showing a modified form of handle.

Referring to the drawings wherein similar numerals designate similar parts of the structure, the numeral 10 generally designates an elongated rail-like base member, preferably of a light weight metal, for instance aluminum or alloys thereof. The base member preferably comprises a pair of longitudinal side legs or wings 12 and 14, symmetrically arranged in an inverted V relationship on opposite sides of an axis 15, and a top 16 defined by the apex of the V, the top including a raised handle portion generally designated by the numeral 17.

As seen in Figures 1 to 3 the V arrangement of the legs extends the full length of the base 10. Moreover, it will be observed from Figures 3, 4, and 5 that the bottom of the base at the lower end of the legs 12 and 14 respectively, adjacent the inner edges thereof is provided with flat preferably smooth co-planar level checking faces 18 and 20 respectively for checking horizontal and vertical surfaces. These faces are preferably obtained by machining and or grinding and polishing operations. As seen in Figure 5 the faces 18 and 20 are at right angles to the axis 15 and form substantially 45 degree angles with the legs.

The legs have a second pair of machined flat smooth level checking faces for checking inside corners. These faces are identified by the numerals 22, 24, and are located at the lower extremity of the legs and extend inwardly from the outer surfaces of the legs to intersect the co-planar faces 18 and 20 referred to above. An advantage of this arrangement is that the checking faces avoid the corner and enable the device to be held stable when taking a reading.

The inner surfaces of the legs as seen in Figures 2 and 5 are recessed to form the longitudinal ribs 26 and spaced apart transverse ribs comprising the end ribs 28 and intermediate ribs 30. The ribs aforesaid on the leg 12 are preferably made flat and smooth and provide the spaced apart transverse level checking faces 32, 34, 36, 38, and 40 which together with the longitudinal level checking face 42 machined on the longitudinal rib 26 of this leg are all co-planar and provide a checking plane generally designated by the numeral 44 which as seen in Figure 4 forms an angle of 135 degrees with the face 18 of this leg and an angle of 90 degrees with the face 22. Ribs similar to those on the leg 12 are preferably similarly located on the leg 14 and are machine flat and smooth to provide the spaced apart transverse level checking faces 45, 46, 48, 50 and 52 and a longitudinal level checking face 54 on the longitudinal rib 26 of this leg. All of these faces are co-planar and provide a checking plane generally designated by the numeral 56 in Figure 4 which plane forms an angle of 135 degrees with the face 20 and is at right angles to the face 24 on this leg and the plane 44 on the leg 12. It will be noted that the transverse ribs are relieved at their intersection 57. This is advantageous when checking sharp cornered structures by the planes 44 and 56 since the level checking faces thereby avoid interference with corner burrs or imperfections.

The rib arrangement serves to give lightness and strength to the structure and reduces the possibility of warping when machining the leveling surfaces from a casting. Moreover, the spaced transverse checking faces assure greater precision when checking the level of surfaces having an occasional bulge. The planes 44 and 56 formed by these spaced faces will generally be used for checking outside corners.

In order to provide means for checking the horizontal level of overhead beams I have made my device with an additional checking plane generally designated by the numeral 58, which as seen in Figure 1 preferably comprises a plurality of co-planar flat smooth machined faces 60, 62, 64, 66, and 68 provided on the surfaces of ribs 70 of the leg 14. It will be understood that similar ribs and faces may be provided on the leg 12. Moreover, the plane 58 may be constituted of a single face the length of the base 10. However, the spaced faces are preferred for lightness, for avoiding occasional surface bulges, and to eliminate warping effects.

The raised hollow handle portion 17 extends longitudinally from one end 72 of the base to the mid-region thereof. The portion 17 has its outer surface transversely curved as seen in Figure 4 and has re-entrant portions 73 where it joins the surface 74 of the base top portion 16. Moreover, as seen in Figures 1 and 3 the handle portion which is of considerable depth relative to the base legs tapers both in plan and elevation toward the end 72 to provide a convenient finger grip. In the modification of Figure 14 the opposite side portions have been recessed as at 75.

The handle 17 has a circumferential wall 76 and end walls 78, 80 defining an internal recess 81 which extends through the top 16 of the base, the wall 76 connecting with the legs 12 and 14. The end wall 80 is formed with a horizontal juxtaposed extension 81A slightly raised above the adjacent surface 74 of the top 16 and providing with the wall 80 a step 82 having a vertical face or riser 84 normal to the checking faces 18 and 20, and a horizontal or base face 86 parallel thereto.

Suitably mounted in bores or apertures 88 and 89 respectively of the step 82, as for example by plaster are similar bubble type spirit box or slab levels or indicators A and B respectively which may be of any of the forms shown in the drawing but will preferably have the construction shown more particularly in Figures 3 and 5. The indicator A will have its front to rear axis 90 paralleling all of the level checking faces of the legs 12 and 14 and preferably normal to the face 84 of the step 82, and the indictor B will have its front to rear axis 91 normal to the co-planar faces 18 and 20 and preferably normal to the face 86 of the step 82. These axes 90, 91 will also preferably be co-planar with the axis 15 of the base 10 or may be parallel to the same. Mounting of the indicators is facilitated by the provision of a rear face or shoulder 92 for holding the plaster in place. Moreover, in order to prevent damage to the indicitors A and B the exterior windows or faces 93 and 94 respectively thereof are made flush with and preferably set in below the faces 84, 86 respectively of the step 82. If desired, the indicators may be covered by suitable glass or other transparent plastic windows.

The levels are of the bubble type wherein movement of the device in any position brings a response by the bubble which is visually discernable in the face of the level. Each comprises a casing 95 having a thin clear or transparent front wall, cover or face such as the faces 93, 94. Sealed within the casing by well known procedure is a fluid such as alcohol. The latter fills the casing except for a minute space to provide the usual air bubble 96 for indicating the level or other determinate position. In the construction shown in Figure 3 the two levels A and B are arranged in juxtaposition so that the bubbles 96 of both may be observed at the same time and one may serve as a check against the other. Thus, for example, when the level checking faces 18 and 20 are in contact with a level surface the bubble 96 of the level B will be centered as seen in Figure 1 and the bubble of level A will rise and settle as seen at 97 in Figure 5 at the upper side of the casing and coincident with the indictor axis 98 which is co-planar with the axis 91 of indicator B. Conversely, when a vertical surface is being checked the bubble of the level A will be contered as seen in Figure 5 with the axis 90 of this indicator and the bubble of the level B will rise to the upper center edge portion of its case as seen at 99 in Figure 1 on the axis 100 of the level B.

To facilitate centering of the bubble and obtain greater sensitivity, that is, ability to respond rapidly and become stable once the leveling device is positioned, each level A and B is preferably plano-convex in character, the convex sides of the indicators A and B respectively being the faces 93, 94 respectively which as indicated above are thin clear, transparent or translucent windows of glass or other plastic through which the bubble may be observed. The convex character of the window tends to urge the bubble upwardly and cause it to become centered as quickly as possible when shifting the leveling device. The amount of curvature need not be great, that shown in the drawing being suggestive.

As pointed out above when the bubble of the principal level is read centrally in the face window thereof the bubble of the checking level, in most cases, will rise to the uppermost edge of its window and in order that the greater portion of such bubble may be made readily visible while simultaneously observing the bubble of the principal level, the sides of the casing are tapered or sloped toward the back that is away from the window. This construction urges the bubble towards the window when the level has for example its front to rear axis horizontal. Moreover, in order to provide the checking bubble with the same relative sensitivity as the bubble in the face of the principal level, the side of the casing with which the checking bubble is in contact is not only tapered or sloped rearwardly but is crowned peripherally whereby to urge the bubble to the highest point of the edge face of the casing and assist it in responsing to any movement of the leveling device. Although the crown shaping may be obtained by a circular section the reaction of the bubble will be sluggish as compared to the greater sensitivity obtained by a flatter curvature. Sensitivity equal to the face will be obtained if the amount of the crowning is substantially that of the convex face of the indicator, that of Figure 5 being suggested. Best results from the standpoint of visibility, reading, and error indication, are obtained where lengthy sides of flat curvature are provided. Thus, a four sided indicator as illustrated by the indicators A and B in Figures 1 and 5 is preferred. However a different number of sides may also be employed in some applications.

It will be observed that the levels in Figures 11 and 13 have convex faces and are of cylindrical section whereas those of Figures 7 and 9 have convex faces and are of conical section. Certain of the advantages stated above will be obtained with these constructions. Preferably, the box levels for use in my invention will be made as the indicators A and B with a convex face, four sides which taper rearwardly and are crowned peripherally substantially the same extent as the convex face window. This combination provides a level with exceptional bubble sensitivity and makes possible the use of such level in any one of four positions in addition to that in which it is commonly used, of looking into the face. As seen in Figure 5 the top and bottom crowned sides of the level A in this figure are made to generally parallel the faces 18 and 20 of the base legs so that the high point of the crowned portions coincides or intersects with the axis 98 of the indicator A and preferably though not necessarily with the axis 15 of the device in this figure.

In order to detect exact perpendicularity or level of surfaces in contact with the various level checking faces of the device and to enable the device to ascertain or denote by means of the box levels the approximate amount and direction of the angular error of the surfaces being checked the convex window of the box levels of my invention, for example the levels A and B, will preferably have etched or otherwise formed thereon a center marker or circle preferably the size of the bubble. On diametrically opposite sides of the center marker centrally of and extending inwardly from each of the crowned sides 95 of the box casing there will also be line indicators. These will preferably take the form of pairs of parallel lines 102, 103 preferably spaced apart a distance the size of the bubble. The length of the lines should be sufficient to observe movement of the bubble relative thereto. A suggested length is the diameter of the bubble. The indicators in Figures 6 and 10 have single lines. This arrangement may have preference in certain uses, but the double lines make error detection easier to observe.

In practical application of the device of my invention the surfaces 18 and 20 of the base legs will be placed against horizontal or vertical surfaces respectively for checking the level and plumbness respectively thereof. In this operation the indicator B will be used as the principal level for horizontal surface checking and the indicator A for the vertical checking, the adjacent level indicator in each instance being used as a spot check against the principal level.

In conjunction with the plane 58 of Figure 4 the faces 18 and 20 may be used for contacting overhead beams to establish horizontal positions. The principal reading will be taken on the indicator B at the upper double lines.

The faces 22 and 24 may be readily used for checking inside corners. If vertical, the principal reading will be taken at the center of indicator A and the checking reading made on the indicator B as at 99 in Figure 1. Horizontal level reading will be read on the indicator B. The plane 58 and faces 18 and 20 may also be used for checking the level of horizontal inside corners.

The interior surface planes 44 and 56 as seen in Figure 4 are used for establishing true perpendicularity or levelness of tubular, square, or angular sectional members or round or flat surfaces. Thus for example these checking planes may be used for testing the plumbness of a building stud for example a 2 x 4 which must be checked in two planes. With my device the plane 44 is brought in contact with one of the stud faces and the plane 56 in contact with the other thus enabling both to be checked simultaneously. In this connection the bubble of the level indicator A will indicate in a general way at its center the condition found and if there be error in the plumbness of the stud it will indicate the general direction of the error while the level indicator B will assist in indicating the extent of the error, the latter reading being taken at the bubble position 99 in Figure 1.

From the foregoing description it will be evident that I have presented a novel leveling device of great sensitivity making possible precision-like checking of the level or plumbness of any surface or object whose level is to be determined. The device is easily handled and readily used without special instructions. It will indicate the general conditions found and where there is error will provide some measure of the extent of such error its sensitivity in this respect being as much as one hundredth of an inch for each eighteen minutes of angular error. In addition, my device provides a means of making possible foolproof observations. The user does not have to fumble or guess whether or not the device is being properly employed as the principal and verifying level combination I employ in my device gives confidence to the user and prevents improper application of the device.

Although the various embodiments of my invention illustrated in the drawing and described above are well adapted for carrying out the objects of my invention it will be understood that modifications, changes and substitutions may be made without departing from the spirit thereof, and the present invention and all its parts are hence to be construed to include all such modifications, changes and substitutions as may come within the scope of the following claims.

I claim:

1. A leveling device comprising an elongated base having a pair of longitudinal side legs disposed in inverted V relationship and a top defined by the apex of said V, said legs having co-planar flat level checking faces at the bottom edges thereof spaced apart co-planar flat level checking faces at the inner surface of each leg and flat level checking faces adjacent the outer sides of said legs at right angles to said inner faces and said top including a raised handle portion extending longitudinally from adjacent one end of the base to the mid-region thereof, the outer surface of said handle tapering toward said one end of said base.

2. A leveling device as claimed in claim 1 wherein the base is metallic and the handle portion is recessed.

3. A leveling device comprising an elongated base and level indicating means on said base, said base having a pair of longitudinal side legs disposed in inverted V relationship, and a top defined by the apex of said V, each of said legs having a first flat level checking face at the inner side thereof, a second flat level checking face at the bottom thereof adjacent said first face, and a third flat level checking face at the bottom thereof at right angles to said first face and adjacent the outer side of the legs.

4. A leveling device comprising an elongated base and level indicating means on said base, said base having a pair of longitudinal side legs disposed in inverted V relationship and a top defined by the apex of said V, each of said legs having a first flat level checking face at the inner side thereof, a second flat level checking face at the bottom thereof adjacent said first face, a third flat level checking face at the bottom thereof at right angles to said first face and adjacent the outer side of the leg, and at least one of said legs having a fourth flat level checking face at the outer side thereof adjacent said third face and at right angles to said second face.

5. A leveling device comprising an elongated base and a pair of level indicating means on said base, said base having opposite ends a pair of longitudinal side legs disposed in inverted V relationship and a top defined by the apex of said V, said legs having co-planar flat level checking faces at the bottom edges thereof, inner flat level checking faces at right angles to each other, and said top including a raised handle portion having an inner end face spaced from the said ends of said base and a further face generally paralleling said co-planar faces and forming the base of an L with said end face, one of said indicating means being in said end face and the other in said further face.

6. A level checking device comprising an elongated base having a pair of longitudinal side legs disposed in inverted V relationship and a top defined by the apex of said V, said legs having co-planar flat level checking faces at the bottom edges thereof and inner flat level checking faces at right angles to each other, and said top including a raised handle portion having an inner end face and said top including a shallow raised portion having a face at a substantial L with said end face, there being level indicating means in each of said faces forming said L.

7. A leveling device comprising an elongated base having a pair of longitudinal side legs disposed in inverted V relationship and a top defined by the apex of said V, said legs having co-planar flat level checking faces at the bottom edges thereof and inner flat level checking faces at right angles to each other, and said top including a raised handle portion having a step at one end thereof presenting substantially right angle faces, there being a level indicating means in each of said latter faces.

8. A leveling device as claimed in claim 5 wherein the indicating means are imbedded at least flush with the faces forming said L.

9. A leveling device as claimed in claim 5 wherein the indicating means have their axes in a longitudinal plane at right angles to said co-planar level checking faces and which plane substantially pass through the intersection of the planes containing said inner level checking faces.

10. A leveling device comprising an elongated base having opposite ends, a pair of longitudinal side legs disposed in inverted V relationship and a top defined by the apex of said V, said legs having co-planar flat level checking faces at the bottom edges thereof, inner flat level checking faces at right angles to each other and at 45 degrees to said co-planar faces, said top including a raised handle portion extending longitudinally thereof and having an inner end face spaced from the said ends of said base and said top having a face forming the base of an L with said end face; there being a spherical faced level indicator in each of said faces of said top forming said L, each indicator having a level indicia centrally thereof and having a floating bubble, the bubble of said indicator in said end face being adapted to register with its central indicia when said co-planar checking faces are engaged with a plumb surface and the bubble of the indicator in the other of said L faces being adapted to register with its indicia when said co-planar faces are engaged with a horizontal level surface.

11. A leveling device comprising an elongated base having opposite ends, a pair of longitudinal side legs disposed in inverted V relationship and a top defined by the apex of said V, said legs having co-planar flat level checking faces at the bottom edges thereof, inner flat level checking faces at right angles to each other and having their apex in said top, said top including a raised handle portion extending longitudinally thereof having an inner end face intermediate the ends of said base and said top having a face forming the base an L with said end face; there being a spherical faced level indicator in each of the faces forming said L, each indicator having a level indicia centrally thereof and having its axis in a plane normal to a plane containing said co-planar checking faces, and the axes of said indicators being normal to each other.

12. A leveling device comprising an elongated base having a pair of longitudinal side legs disposed in inverted V relationship and a top defined by the apex of said V, said legs having co-planar flat level checking faces at the bottom edges thereof, inner flat level checking faces at right angles to each other and at 45 degrees to said co-planar checking faces, additional flat faces at the bottom edges thereof at right angles to said inner checking faces and adjacent the outer side of the legs and said legs having at least one thereof provided with a further face at right angles to said co-planar checking faces; said top including a raised handle portion extending longitudinally thereof having an end face, and said top having a face forming an L with said end face; there being a spherical faced level indicator in each of said faces forming said L, each indicator having a floating bubble and having level indicia in the spherical surface thereof including a central circle and edge graduations arranged around said circle at 90 degrees to each other, the graduations of said indicators being so arranged relative to each other such that a plane passing through the circles and paralleling opposite graduations of each indicator is normal to the plane containing said co-planar checking faces whereby when said co-planar checking faces are in contact with a level surface the bubble of said indicator in said top face will register with its circle and the bubble of the indicator in said end face will register with the uppermost of its graduations.

13. A leveling device as claimed in claim 12 wherein the graduations on said indicators are arranged in pairs with the graduations comprising each pair spaced apart a distance substantially the width of the central circle.

14. A leveling device as claimed in claim 12 wherein said inner faces, and said further face on said one leg each comprise a plurality of longitudinally spaced surfaces coincident with ribs on said base legs.

15. A leveling device as claimed in claim 11 wherein the indicator has a body of four sided character connecting the spherical face thereof with each side convex in shape and with the opposite sides converging toward each other rearwardly of said face.

LOUIS C. BETTEGA.

References Cited in the file of this patent

UNITED STATES PATENTS

| Number | Name | Date |
| --- | --- | --- |
| 423,094 | Taylor | Mar. 11, 1890 |
| 666,843 | Brownell | Jan. 29, 1901 |
| 778,808 | Starrett | Dec. 27, 1904 |
| 904,003 | Maldrett | Nov. 17, 1908 |
| 1,017,457 | Perlik | Feb. 13, 1912 |
| 1,020,020 | Brawley | Mar. 12, 1912 |
| 1,273,510 | Lindquist | July 23, 1918 |
| 1,418,544 | Dodge | June 6, 1922 |
| 1,488,419 | Ward | Mar. 25, 1924 |
| 1,490,927 | Johansson | Apr. 22, 1924 |
| 1,630,174 | Elsas | May 24, 1927 |
| 2,084,798 | Gabriel | June 22, 1937 |
| 2,145,988 | Meder | Feb. 7, 1939 |
| 2,250,771 | Lanner | July 29, 1941 |
| 2,307,892 | Lawther | Jan. 12, 1943 |
| 2,432,124 | Raines et al. | Dec. 9, 1947 |

FOREIGN PATENTS

| Number | Country | Date |
| --- | --- | --- |
| 2,967 | Great Britain | Mar. 2, 1886 |
| 4,040 | Great Britain | Feb. 18, 1907 |
| 299,974 | Germany | Aug. 18, 1917 |
| 420,534 | France | Nov. 26, 1910 |